United States Patent
Dailey

(10) Patent No.: US 6,377,560 B1
(45) Date of Patent: Apr. 23, 2002

(54) GROUP CALL CAPABILITY IN A WIRELESS NETWORK

(75) Inventor: Timothy E. Dailey, Forest, VA (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/168,876

(22) Filed: Oct. 9, 1998

(51) Int. Cl.⁷ .................................................. H04Q 7/38
(52) U.S. Cl. ........................ 370/329; 370/432; 455/518
(58) Field of Search ................................ 370/328, 432, 370/390, 329; 455/432, 433, 435, 518, 519; 379/201, 202, 204, 205

(56) References Cited

U.S. PATENT DOCUMENTS

| | | | | |
|---|---|---|---|---|
| 5,222,248 A | * | 6/1993 | McDonald et al. | 455/33.2 |
| 5,235,631 A | * | 8/1993 | Grube et al. | 379/58 |
| 5,465,391 A | * | 11/1995 | Toyryla | 455/33.4 |
| 5,850,611 A | * | 12/1998 | Krebs | 455/426 |
| 5,852,781 A | * | 12/1998 | Ahvenainen | 455/509 |
| 5,930,723 A | * | 7/1999 | Heiskari et al. | 455/518 |
| 5,970,417 A | * | 10/1999 | Toyryla et al. | 455/519 |
| 6,178,166 B1 | * | 1/2001 | Wilson et al. | 370/335 |
| 6,253,091 B1 | * | 6/2001 | Naddell et al. | 455/519 |

FOREIGN PATENT DOCUMENTS

| | | |
|---|---|---|
| GB | 2 271 690 | 4/1994 |
| WO | WO 94 28687 | 12/1994 |

* cited by examiner

*Primary Examiner*—Douglas Olms
*Assistant Examiner*—Ken Vanderpuye
(74) *Attorney, Agent, or Firm*—Coats & Bennett, P.L.L.C.

(57) ABSTRACT

A wireless network with a group call capability. The wireless network includes a mobile switching center connected to a plurality of base stations each serving a portion of the wireless network and communicating with mobile stations on a plurality of channels. Each base station allocates one of the channels for the group call. Each mobile station in the group sends an acknowledgement of the group call to the base station serving the area where the mobile is located. Each base station that did not receive an acknowledgement frees the allocated channel for use in other calls.

12 Claims, 5 Drawing Sheets

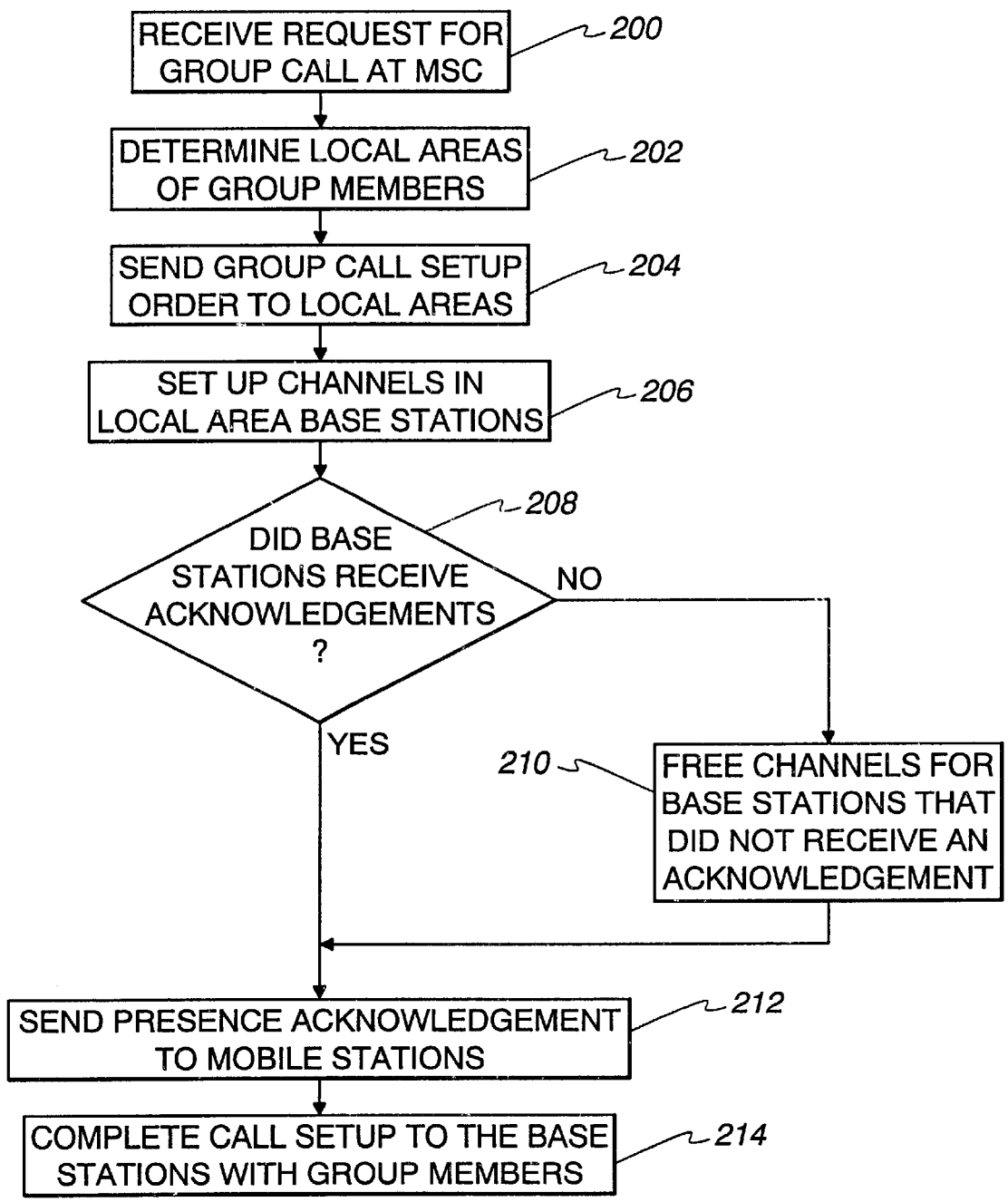

| Fig. 3a |
| Fig. 3b |

GROUP CALL CAPABILITY IN A WIRELESS NETWORK

FIELD OF THE INVENTION

This invention relates generally to wireless networks, and, more specifically, to setting up a group call in a wireless network.

BACKGROUND OF THE INVENTION

Wireless networks (also called cellular networks) are built around the premise of a one-to-one call; that is, each channel in the wireless network is used by only one mobile station at a time. There are some applications, however, where a one-to-many call is useful. In a public safety application, for example, a dispatcher may want to communicate to a number of mobile stations simultaneously. While a one-to-many call is technically feasible in today's wireless network, the current call setup scheme may be too slow for public safety and other time-intensive applications.

In current call setup, a mobile switching center receives a call for a mobile station and queries a home location register for that mobile station's current location. The home location register reports the local area (a group of contiguous cells in the wireless network) in which the mobile station last registered. Since the mobile switching center knows only the approximate location of the mobile station, it causes all of the base stations in the local area to transmit a paging message on a paging channel to determine the exact location of the mobile station. When a mobile station receives the page, it responds to the nearest base station. The base station notifies the mobile switching center, which routes the call to the base station to be delivered to the mobile station.

While the above-described call setup is relatively efficient for a one-to-one call, repeating all of the steps for each member of a group may take considerable time and be very cumbersome. Paging for and locating all of the group members individually may cause heavy message traffic and require many system resources.

SUMMARY OF THE INVENTION

According to one aspect of this invention, a method is provided for use in a wireless network for setting up a call among a group of mobile stations in the wireless network. The wireless network has a plurality of cells, each cell includes a base station that has a plurality of channels for communicating with mobile stations located within the cell. The method includes the steps of each base station allocating a channel as a group call channel, each mobile station in the group acknowledging allocation of the group call channel, and each base station that did not receive an acknowledgement within a time period freeing the group call channel.

According to a further aspect of this invention, the wireless network has a plurality of local areas, each local area comprising a plurality of adjacent cells and each mobile station registering with the wireless network when it changes local areas. The step of allocating a channel includes each base station in the local area with a registered group member allocating a channel for the group call. According to another aspect of the invention, each base station that receives an acknowledgement from one of the mobile stations in the group sends a presence acknowledgment to each mobile station in the base station's cell.

In accordance with a further aspect of this invention, each channel may be a plurality of timeslots on a radio frequency, and the step of sending an acknowledgement may be each mobile station generating a random number and sending the acknowledgement to the base station on a timeslot selected by the random number. Further, each mobile station may repeatedly send the acknowledgement to the base station until receipt of the base station's presence acknowledgement. In accordance with yet another aspect of this invention, each mobile station may send an identification of itself to the base station with the acknowledgement, said wireless network determining whether one or more of the group members are present on the group call.

According to another aspect of this invention, the wireless network has a plurality of local areas in which each mobile station registers when it is in any cell in the local area. The method further includes the step wherein each base station in the local area with a registered group member allocates a channel for the group call. Further, each base station that receives an acknowledgement from a mobile station sends a presence acknowledgement back to the mobile station.

In accordance with another aspect of the invention, a wireless network capable of setting up a group call includes a mobile switching center and a plurality of base stations connected to the mobile switching center. The mobile switching center is adapted to notify the plurality of base stations of a group call and the plurality of base stations are adapted to allocate a communication channel for the group call. Further, each of the plurality of base stations is adapted to deallocate the communication channel if it did not receive an acknowledgement within a predetermined time.

In accordance with another aspect of this invention, the wireless network includes a group location register that is adapted to store the location where the mobile stations in the group are currently located. Further, the base stations are organized into a plurality of local areas wherein the group location registers stores the local area where the mobile stations in the group are currently located. In accordance with a further aspect of the invention, the wireless network includes a group location register adapted to store a plurality of cells where group members may be located. Finally, the wireless network may be organized into a plurality of local areas and the group location registers storing the local areas where group members may be located.

BRIEF DESCRIPTION OF THE DRAWINGS

A more complete understanding of this invention may be obtained from a consideration of the following detailed description in conjunction with the drawings, in which:

FIG. 2 flow chart of a group call set up in the wireless network of FIG. 1;

DETAILED DESCRIPTION

Figure 1:
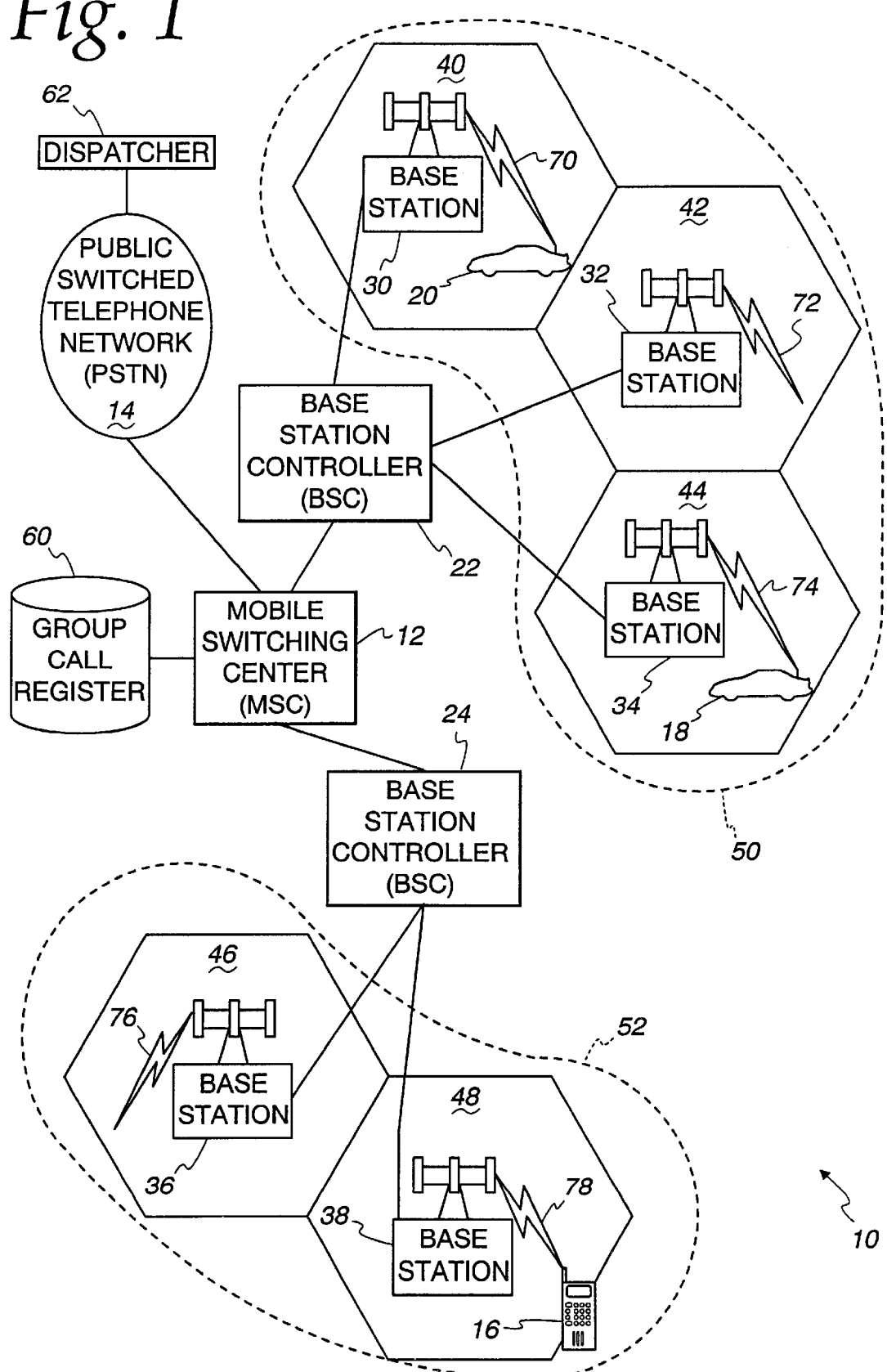
FIG. 1 is a block diagram of a wireless network that supports a group call setup in accordance with this invention.

FIG. 1 illustrates a group call setup in the context of a wireless network 10 according to this invention. The wireless network 10 includes a mobile switching center (MSC) 12 that provides call connection and control between calls to and from a public switched telephone network (PSTN) 14 and mobile stations, such as mobile stations 16, 18 and 20, in the wireless network 10, and between mobile stations 16, 18, 20 within wireless network 10. In this exemplary embodiment, MSC 12 is connected to base station controllers (BSC's) 22 and 24. BSC's 22 and 24 each provide communication connections and control of a plurality of base stations. In this illustration, BSC 22 provides communication connections and control for base stations 30, 32 and 34, and BSC 24 provides communication connections and control for base stations 36 and 38. The base stations 30, 32, 34, 36 and 38 in turn provide communications channels and control for any mobile stations within the base station's coverage area or "cell" 40, 42, 44, 46 and 48, respectively. The cells 40, 42 and 44, and 46 and 48 are grouped into local areas 50 and 52, respectively, as is known in the art, so that a mobile station, such as 16, only has to register when it enters local area 52, as opposed to registering each time it moves into a new cell 48. Of course, there are many more base stations, base station controllers and local areas in an operating wireless network.

In the illustrative embodiment of FIG. 1, there are, for example, three members of a group, namely mobile stations 16, 18 and 20. Of course, a group may contain more or fewer members and there would generally be multiple groups supported by a wireless network. Mobile station 16 is in cell 48 in local area 52 and mobile stations 18 and 20 are in cells 44 and 40, respectively, in local area 50. As each mobile station 16, 18 and 20 registers with MSC 12, MSC 12 send the identification of the respective local area 50 and 52 to the home location register (not shown but well-known in the art). Additionally, MSC 12 stores the local areas 50 and 52 in a new group call register 60 according to this exemplary embodiment of this invention. Group call register 60 records the local areas of each member of each group. Alternatively, group call register 60 may store identifications of local areas to be used for group call setup. This alternative data would be useful, for example, if the mobile stations are relatively stationary, as would be the case if a mobile station used in a fire station or some form of "fixed wireless," as is known in the art.

A group call may be initiated from any location. For example, one of the group members such as mobile station 16 may initiate a group call. This invention will be described in connection with a dispatcher-based group call as would be used in, for example, fire, safety or police applications. A group call according to this invention is initiated by a dispatcher 62 dialing a predefined directory number. The call is routed through the PSTN 14 which recognizes the directory number as a number that is delivered to MSC 12. The call is delivered to MSC 12, where the directory number is analyzed and a determination made that a group call is requested. Alternatively, the dispatcher 62 may be directly connected to MSC 12 and delivers a special code to initial a group call.

A group call setup will now be described in connection with FIG. 1 and FIG. 2. In action box 200, a call request is received at mobile switching center 12. When the MSC 12 analyzes the directory number, it discovers that the call is a group call and derives the group identification. In action box 202, the MSC 12 determines the local areas where group members are (or may be) located. To this end, MSC 12 refers the directory number to group call register 60. As stated above, the group call register 60 may store the actual local areas in which the group members were most recently registered or, alternatively, may store a list of local areas where group members are likely to be located. In either case, MSC 12 sends a group call setup order to local areas returned from group call register 60 in action box 204.

In this example, such group call setup orders are sent to BSC 22 for local area 50 and BSC 24 for local area 52. In this exemplary embodiment, BSC's 22 and 24 cause all base stations in the identified local areas to set up a channel in action box 206. Of course, base stations in the wireless network may be directly connected to mobile switching center 12 as is common in analog wireless and trunked radio networks.

Each base station 30, 32, 34, 36 and 38 allocates a voice channel in response to the group call and sends an assignment message on the control channel. Arrows 70, 72, 74, 76 and 78 represent such channels. In this manner, paging messages are not sent through all base stations in the local area, which saves resources and time. A timer is then set and, in decision diamond 208, a determination is made as to which base stations received acknowledgements from group members on the voice channel. In the example of FIG. 1, group members 18 and 20 in local area 50 each send an acknowledgement to base stations 34 and 30 respectively. Group member 16 sends an acknowledgement to base station 38 in local area 52. Processing moves to action box 210 where channels 72 and 76 for the base stations that did not receive an acknowledgement (base stations 32 and 36) are deallocated. In action box 212, the base stations 30, 34 and 38 acknowledge the presence of group members in their respective cell. The call is then completed to the group members that have acknowledged, in action box 214.

Adding a group call feature to an existing wireless network requires fast call setup, especially for critical communications such as public safety. The present invention skips the paging step of normal call setup and immediately allocates a voice channel for the group call on any cell that might contain a group member. Group members recognize a group identification on the channel and indicate their presence by transmitting a short burst of information on the channel back to the base station. Any base station that has not received an acknowledgement from a group member within a predetermined period of time drops the channel, freeing it for another call. This novel approach allows fast group call setup and minimizes wasted resources.

Figure 3A:
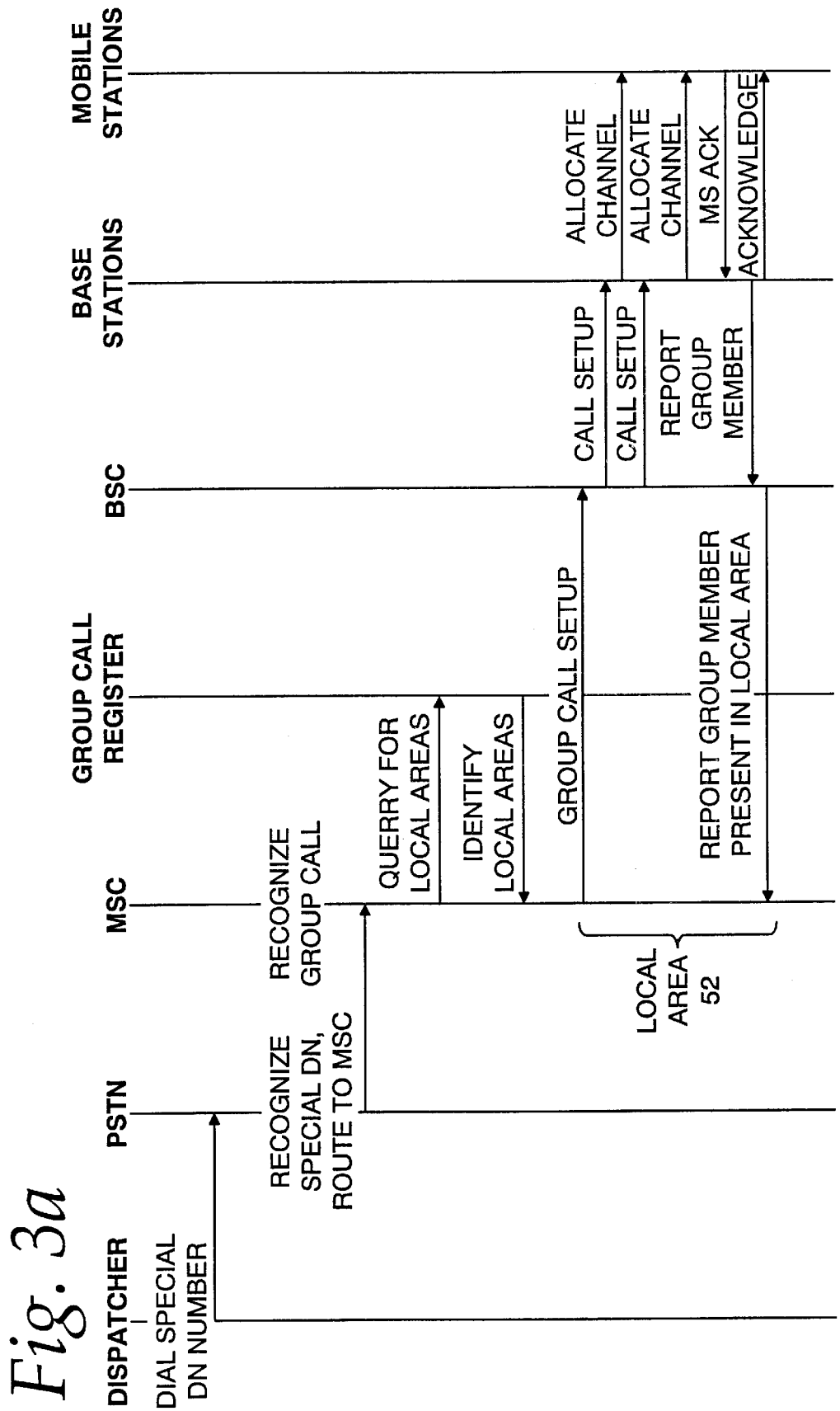
FIG. 3 is a message flow diagram of a call setup in the wireless network of FIG. 1.
Figures 3, 3B:
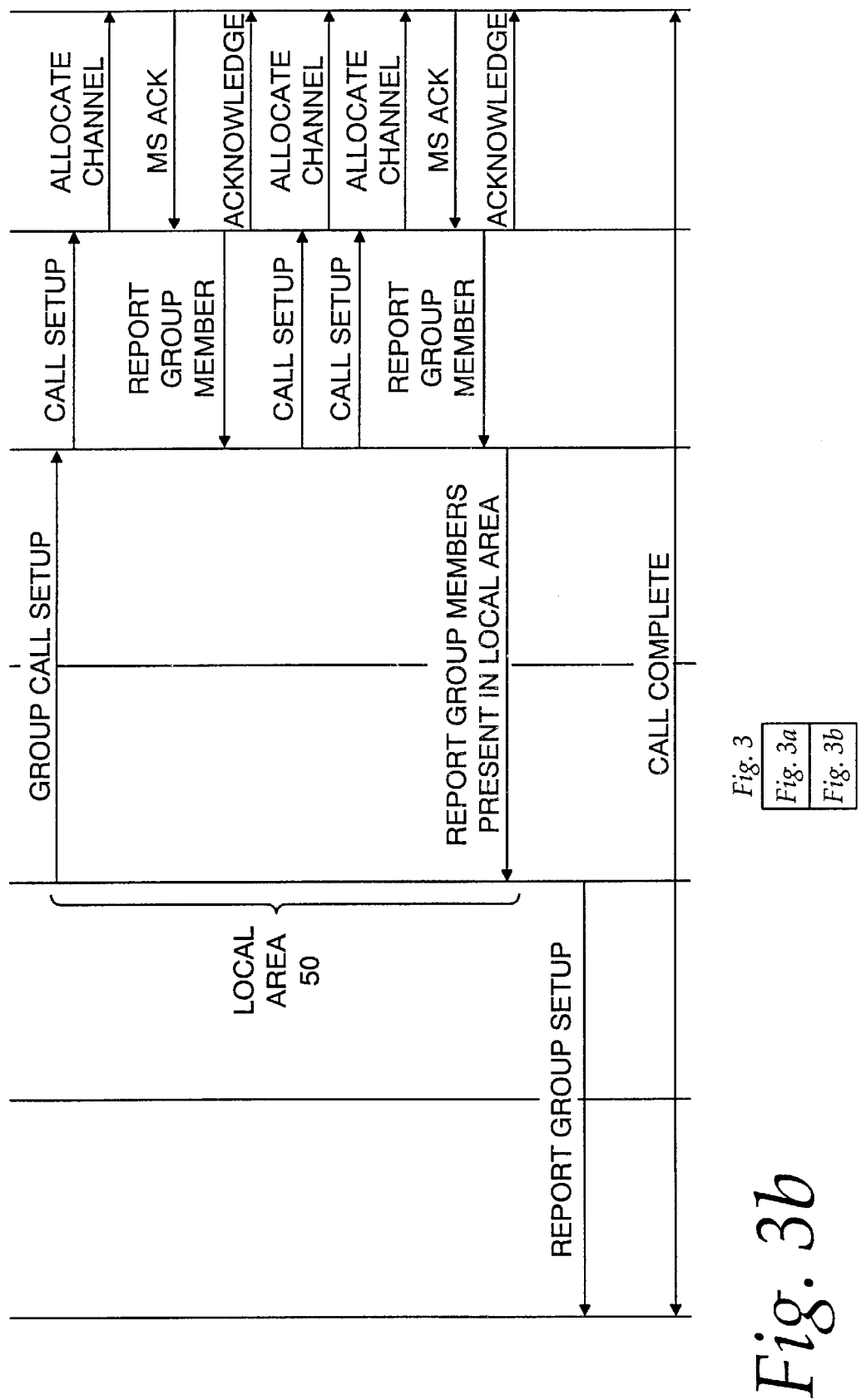

Message flow according to an exemplary embodiment of this invention will now be explained in connection with FIGS. 1 and 3. The dispatcher 62 dials a special directory number (DN), or, alternatively, keys in a special code, which directs the telephone call through the PSTN 14. The PSTN 14 recognizes the special directory number and routes the call to the MSC 12. Of course, the dispatcher 62 may be connected directly to the MSC 12.

The MSC 12 recognizes the DN or the special code as being a group call and sends a query to the group call register 60 requesting local areas in which to set up the group call. The group call register 60 returns the identification of local areas 50 and 52 to the MSC 12.

The MSC 12 then causes a group call setup to occur in local areas 50 and 52, which were specified by the group call register 60. In this example, local areas 50 and 52 are set up substantially simultaneously. MSC 12 sends a group call setup message to base station controllers (BSC) 22, 24 of local areas 50 and 52, respectively. The BSCs 22 and 24 send call setup messages to all base stations (30, 32, 34 and 36, 38) in their respective local area, which in turn allocate a channel for group member mobile stations 16, 18 and 20 that may be in their service area. The base stations 30, 32, 34, 36, 38 wait for a mobile station acknowledgement (MS Ack) message. The base stations 30, 34 and 38 then optionally report the group members 16, 18, 20 from which they have received an acknowledgment message. The group members 16, 18, 20 are reported present in local areas 50 and 52, which are then reported back to the dispatcher 62. Finally, a group call is completed through the wireless network 10 to the mobile stations 16, 18 and 20.

As stated above, each base station in each local area allocates a channel and sends an assignment message on the control channel substantially simultaneously, and then waits for an acknowledgment from one or more mobile stations. If there is more than one group member in a cell, both will acknowledge substantially simultaneously on the allocated channel. The base station, however, will receive only one acknowledgment. If the presence of at least one group member in a cell is all of the information that is required by the system, then simultaneous acknowledgements are acceptable. If the wireless network needs to know which group members are present, then a method for collision avoidance of the acknowledgments from the group members is required.

Figure 4:
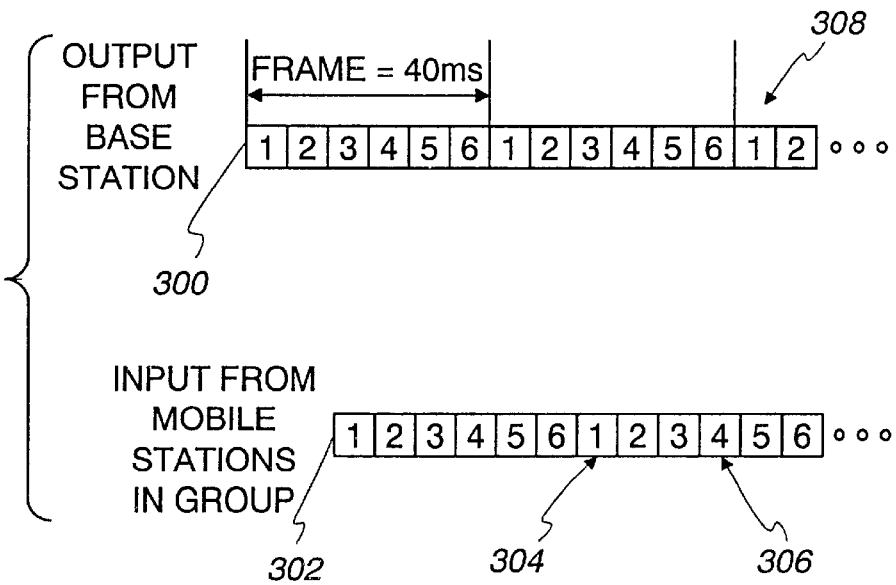
FIG. 4 is a block diagram of timeslots, illustrating mobile station and base station acknowledgements.

Turning to FIG. 4, a block diagram of timeslots in an exemplary time division multiple access (TDMA) system is shown. This diagram illustrates collision avoidance between mobile station acknowledgements when more than one group member is in a cell. Slots 300 are output timeslots from a base station and slots 302 are input from mobile station. One frame (40 milliseconds) includes approximately six timeslots. Slots 1 and 4 of the input timeslots generally are digital traffic channels containing control messages or voice from the transmitting mobile station. In this exemplary embodiment of this invention, acknowledgment collision is avoided by each mobile station in a cell generating a random number from 1 to N, where N is the number of members in the group. Each member of the group then broadcasts during its randomly determined timeslot, at arrows 304 and 306, which response could also include an identification of the mobile station. In the output timeslot at arrow 308, the base station sends presence acknowledgements to one or more mobile stations. Again, this could be either a group acknowledgement or an individual group member acknowledgement. Further, each mobile station may repeatedly send an acknowledgement until it receives a presence acknowledgement.

Figure 5:
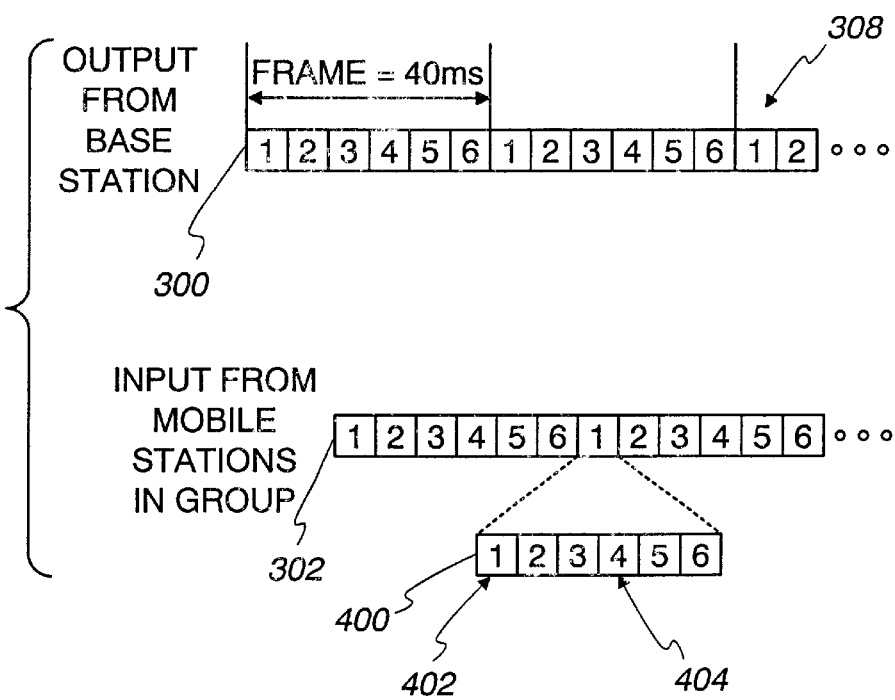
FIG. 5 is a block diagram of micro slots within the timeslots of FIG. 3, illustrating another embodiment of mobile station and base station acknowledgements.

Turning now to FIG. 5, an alternative embodiment of collision avoidance during acknowledgements is described. As in FIG. 4, line 300 is the output timeslots from base stations and line 302 is the input from mobile stations. Line 400 is a plurality of "micro" timeslots which are subdivisions (in this case six) of a larger timeslot. Since the information sent to the base station is a simple acknowledgement and/or an identification of the mobile station, very little time is required for transmission. Therefore, a micro slot may be sufficient for responding to the allocation of the channels. In this example, each mobile station in the group again generates a random number and broadcasts its acknowledgement on the micro slot corresponding to the random number 402 and 404. Of course, each group number could be assigned a full timeslot or a micro slot for acknowledgement purposes.

It will therefore be apparent that this invention makes it possible to economically and simply provide a group call setup without sending multiple paging messages and acknowledgement messages as in normal call setup. Consequently, the need for individual resources for each mobile station is avoided. Further, since base stations that do not receive an acknowledgement deallocate the channels, further resources are conserved. It will further be appreciated that the invention may be added to existing wireless networks with little additional hardware and software. Further, this system could be implemented in a trunked radio network with little or no modification.

It is to be understood that the above-described embodiment is to illustrate the principles of this invention, and that those skilled in the art may devise many variations without departing from the scope of the invention. It is, therefore, intended that such variations be included within the scope of the appended claims.

What is claimed is:

1. A method for use in a wireless network for setting up a call among a group of mobile stations in the wireless network, said wireless network comprising a plurality of cells, each cell including a base station that has a plurality of channels for communicating with mobile stations located within the cell, said method comprising:

each base station allocating a channel as a group call channel;

each mobile station in the group acknowledging allocation of the group call channel by sending an acknowledgement to the base station of the cell where each mobile station is located; and each base station that did not receive an acknowledgement within a time period freeing the group call channel.

2. The method of claim 1 wherein said wireless network comprises a plurality of local areas, each local area comprising a plurality of adjacent cells, each mobile station registering with a local area where the mobile station is located with the wireless network, wherein the step of allocating a channel comprises each base station in a local area with a registered group member allocating a channel for the group call.

3. The method of claim 1 further including the step of
   each base station that receives an acknowledgement from one of the mobile stations in the group sending a presence acknowledgment to each mobile station in the cell.

4. The method of claim 1 wherein each channel comprises a plurality of timeslots, and wherein the step of acknowledging allocation of the group call channel comprises each mobile station generating a random number and sending the acknowledgement to the base station on a timeslot selected by the random number.

5. The method of claim 3 wherein each mobile station repeatedly sends the acknowledgement to the base station of the cell where the mobile station is located until receipt of the base station's presence acknowledgement.

6. The method of claim 1 wherein each mobile station sends an identification of itself to the base station with the acknowledgement, the base station sends the identification to the wireless network and the wireless network determines whether one or more of the group members are present on the group call.

7. The method of claim 1 wherein said wireless network comprises a plurality of local areas, each local area comprising a plurality of adjacent cells, the method further including
   setting up the group call in ones of the plurality of local areas.

8. A wireless network capable of setting up a call among a group of mobile stations, said wireless network comprising:

a mobile switching center connected to a plurality of base stations, said mobile switching center adapted to notify the plurality of base stations of a group call, each of the plurality of base stations being further adapted to allocate a communication channel for the group call and wait for group member acknowledgements from one or more group members, and each of said plurality of base stations being adapted to deallocate the communication channel if it did not receive a group member acknowledgement within a predetermined time.

9. The wireless network of claim 8 further including a group location register adapted to store the last registered location of all of the mobile stations in the group.

10. The wireless network of claim 9 wherein the base stations are organized into a plurality of local areas and said group location register is adapted to store the local area where each of the mobile stations in the group is registered.

11. The wireless network of claim 8 further including a group location register storing a plurality of base stations where group members may be located.

12. The wireless network of claim 11 wherein the base stations are organized into a plurality of local areas, and the group location register stores the local areas where group members may be located.

* * * * *